Feb. 25, 1941.  W. C. GROENIGER  2,233,050
HOT WATER SUPPLY SYSTEM
Filed Nov. 10, 1937  3 Sheets-Sheet 1

INVENTOR
William C. Groeniger
BY
HIS ATTORNEY

INVENTOR
William C. Groeniger
BY
Henry J. Lucke
HIS ATTORNEY

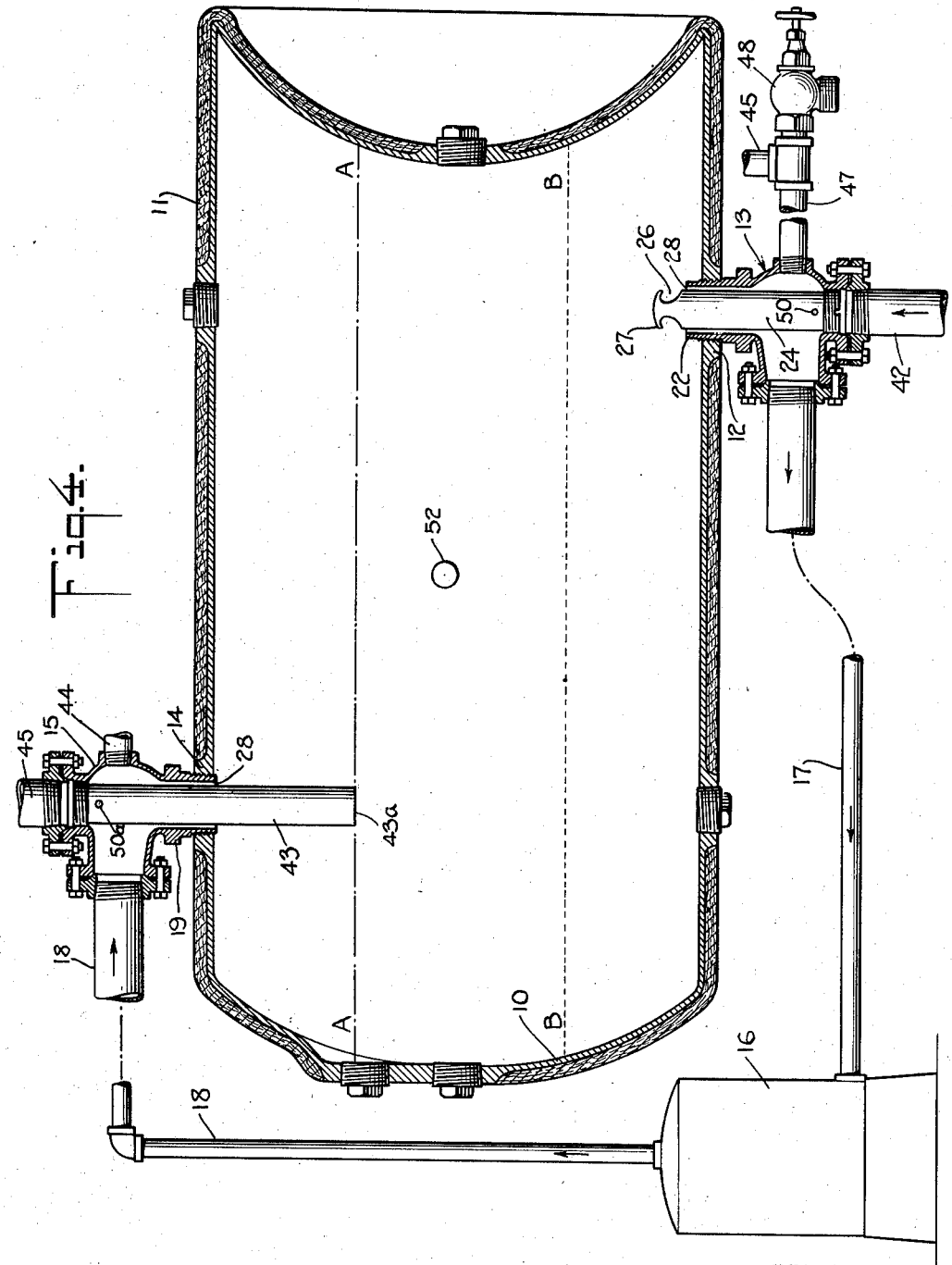

Patented Feb. 25, 1941

2,233,050

UNITED STATES PATENT OFFICE 2,233,050

HOT WATER SUPPLY SYSTEM

William C. Groeniger, Columbus, Ohio, assignor to John B. Pierce Foundation, New York, N. Y., a corporation of New York Application November 10, 1937, Serial No. 173,912

4 Claims. (Cl. 126—362)

This invention relates to improvements in hot water supply systems, and particularly to systems supplying hot water for domestic purposes.

This invention is applicable to various domestic hot water systems, and is of particular value in systems embodying a continuous circulation of heated water from and to a storage tank through a closed circuit pipe line, at required stations along such line, there being risers and/or branches supplying taps or equivalent draw-off devices.

As is well known, flow of water is induced by thermo-syphonic effect, namely, resulting from the difference in weight of equal volumes of water at different temperatures. This invention provides novel means for utilizing the thermo-syphonic effect of temperature differentials in a closed circuit, and attains advantages resulting from such novel means.

Pursuant to this invention, water is withdrawn from the storage tank primarily from a zone arranged between a zone of water at elevated temperature, located at an upwardly portion of the tank, and a zone of comparatively cool temperature, located at a lowerly portion of the tank. As water is drawn from such intermediate zone, the heating effect of the water of the upper zone commingles to an extent with the water of the central, i. e., intermediate, zone and thus counterbalances the cooling effect caused by the commingling of the water of the lower zone. By arranging a substantial reservoir of water in the upward zone, of relatively high temperature, the effective tank capacity may be reduced, for a given output of water at any desired elevated temperature, as compared with systems not employing the invention. Pursuant to the invention, additionally, a relatively great difference in water temperature exists at the inlet and outlet connections at the tank, such difference having great effect in initiating thermo-syphonic circulation.

The invention directs inflowing cold water to the tank, prior to its flow to the water heating means, to effect a preheating of such water. Such preheating is effected by a baffle or other water diffusion means within the tank, i. e., at the outlet of the cold water fitting, such baffle diverting the inflowing cold water stream into and along the lower portion of the storage tank. The water thus is diffused and admixed with warm water in such lower tank portion before flow to the hot water heating device. The stated baffle prevents a direct flow of incoming cold water to the hot water in the central, i. e., intermediate, and upper portions of the tank, and particularly prevents a direct passage of such cold water to the hot water draw-off fitting.

A further feature is that although water flowing through the return line of the circulating system may pass directly to the hot water heater, only a very small part of the extremely hot water leaving the heater is permitted to flow into the line supplying the domestic plumbing or other fixtures at which hot water is made available, such small flow of very hot water serving to accelerate thermo-syphonic circulation without raising the water temperature at the draw-off stations to a dangerous or undesirable degree.

Yet another feature of the invention is that during a period of inactivity of the hot water heater, such inactive period being occasioned by the function of conventional thermostatic or other water temperature control devices, reversed circulation within the system is effectively precluded. Additionally, the invention precludes short circuiting of the circulation system, i. e., a condition of flow in which cold water, flowing into the system to replace hot water being drawn off "short circuits" to the point of hot water withdrawal.

The invention further provides for substantial simplification of piping at the hot water storage tank or equivalent, actual connection therewith being limited to unitary fittings to which all incidental piping connections are made.

Other features and advantages will hereinafter appear.

In the accompanying drawings:

Fig. 4 is a section taken through the storage tank and circulation fittings employed with the system of Fig. 1, showing in detail the connections with the water heating means and hot water piping circuit, the storage tank and its fittings being shown on a relatively enlarged scale.

Figure 1:
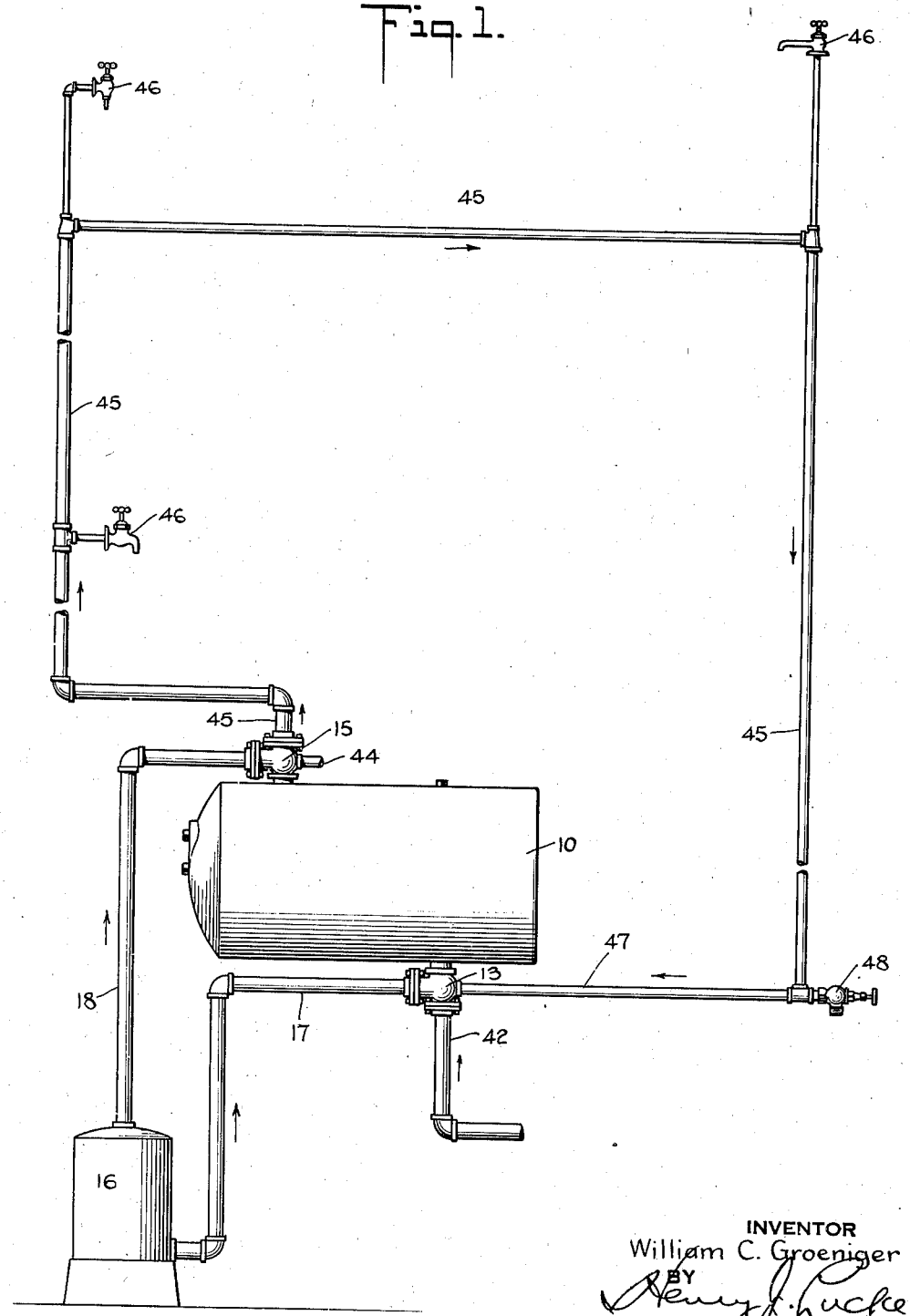
Fig. 1 represents a hot water supply circulating system installed pursuant to this invention, and employing a form of circulation device set forth herein.

Referring to Fig. 4 of the drawings, 10 designates a hot water storage tank or reservoir forming part of my improved hot water supply circulating system. The tank 10 is preferably enclosed in a boiler covering or lagging 11 of asbestos or similar material for the purpose of conserving the heat of the stored water. Where the tank or reservoir 10 is of relatively large size it is preferably mounted horizontally on suitable supports.

As is customary, tank 10 may have thickened wall portions at various locations, such wall portions being drilled and tapped. One of said tappings, as 12 in the lower wall of tank 10, may receive the externally threaded end of a fitting functioning as hereinafter described, in connection with the return of admission of cool water to tank 10; such "cold water fitting" is designated generally by the reference numeral 13. At the upper side of the tank 10 and at a point remote from the cold water fitting 13, a second tapping, as 14, permits a "hot water fitting," i. e., tank inlet and distribution fitting 15, to be similarly connected to the tank.

A heater 16, the rate of fuel combustion in which may be controlled by conventional thermostat, heats water for storage in tank 10, cold water line 17 connecting into fitting 13, and hot water line 18 from the heater connecting into fitting 15.

Figure 2:
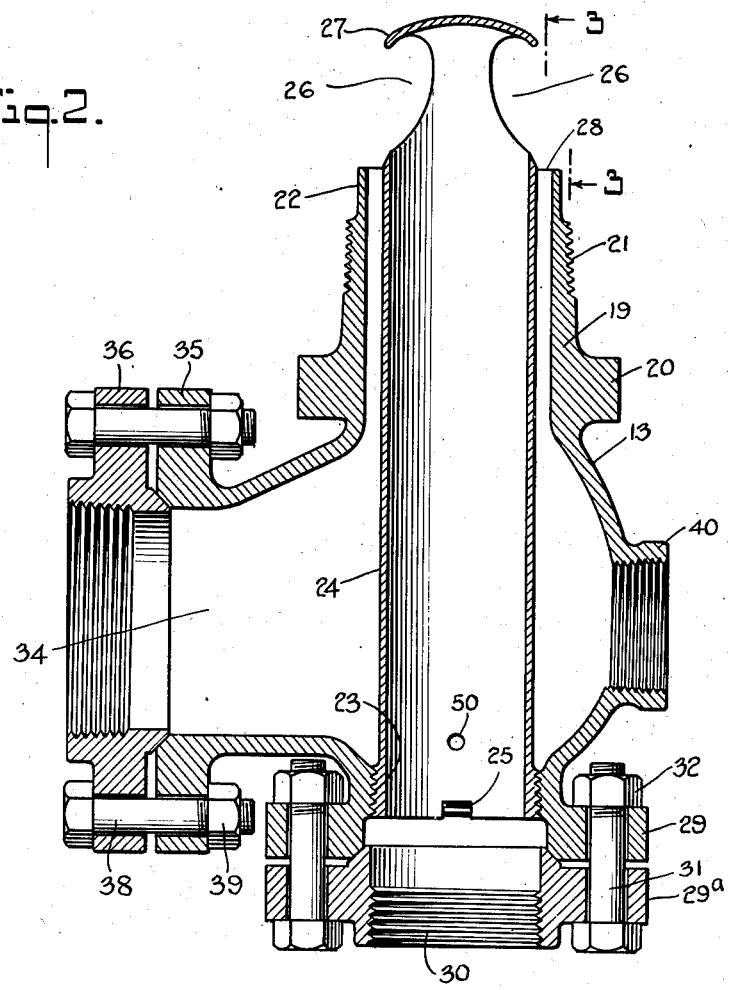
Fig. 2 is a sectional elevation of the "cold water fitting" of Fig. 1, shown on an enlarged scale.
Figure 3:
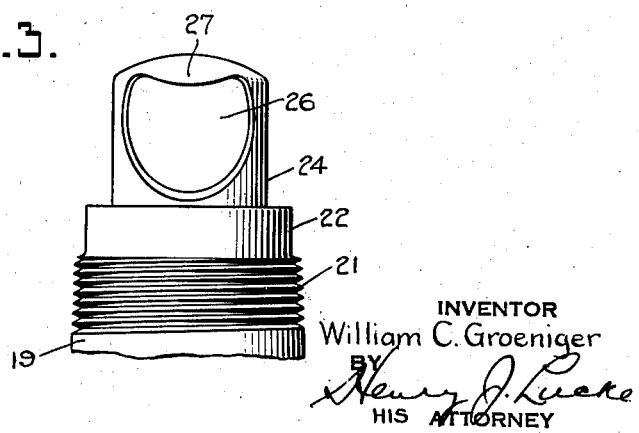
Fig. 3 is an elevation of the cold water diffusion element of the device of Fig. 2.

Referring now to Figs. 2 and 3 where the cold water fitting 13 is shown in detail, the hollow body of the fitting 13 has a suitable tubular extension 19 connecting therewith, one element of the extension preferably being a polygonal shoulder 20 engageable by a wrench or equivalent tool. Additionally, extension 19 may be threaded at 21 for cooperation with tapping 12; fitting 13 thus may be screwed into and through the wall of the tank 10, as shown in Fig. 4. Extension 19, see Fig. 3, terminates in a sediment collar or rim 22 of suitable diameter. The length of rim 22 serves to position the open end thereof above the bottom of tank 10, and therefore above an accumulation of sediment.

The body of the cold water fitting 13 at the point remote from the extension 19 is drilled and tapped as indicated to receive a threaded hub 23 of a cold water inlet tube 24, the threaded hub being in preferably water-tight association with the body of fitting 13. Slots 25 provide for the application of a key or similar tool with which the tube 24 may be screwed into proper position, in which, as shown in Fig. 3, its end extends substantially above sediment rim 22. The terminal end of tube 24 is provided with a plurality of outlets 26, positioned beneath a suitably configurated closure which forms a deflecting plate or baffle 27 for effecting a spread or diffusion of water preferably longitudinally along the bottom portion of tank 10, as later described.

Water tube 24 being concentric with extension 19, and as shown in Figs. 2 and 4 passing through the latter in spaced relationship therewith, an annular passage 28 is formed, providing for flow of water from tank 10 into the body of the fitting 13. The body portion of fitting 13 is preferably substantially spherical, thus providing for flow of water around the tube 24.

The body of cold water fitting 13 adjacent the threaded portion at 23 may be provided with a flange 29 for cooperation with a companion flange 29a having internal threads 30 for connection with a water supply main. Cold water tube 24 thus effects a continuation of the water supply main, and except as later described, substantially all of the inflowing cold water flows into tank 10, subsequently entering the body of fitting 13 through the annular passage 28 for flow through pipe 17 to heater 16. In accordance with conventional practice the stated flanges may be held in operative and watertight association with each other by the bolts 31 and nuts 32.

Cold water fitting 13 is further provided with a communicating passage 34 extending perpendicularly to the axis of the cold water tube 24. A flanged end 35 of passage 34 cooperates with a flange 36 arranged to receive the threaded end of pipe 17, which leads to the heater 16. Flanges 35 and 36 are maintained in cooperative water-tight relation by means of the bolts 38 and nuts 39. Preferably diametrically opposite the passage 34, the cold water fitting 13 is provided with a female-threaded boss 40 forming the point of connection with the return line of the water circulation system, as later described.

Hot water supply fitting 15 may be structurally similar to the cold water supply fitting 13 except that, as shown in Fig. 4, the sediment collar may be eliminated from the tubular extension 19. As a counterpart of tube 24, fitting 15 is provided with a hot water tube 43, such tube being screw-threadedly secured within the body of fitting 15. As clearly indicated in Fig. 4, tube 43 passes through extension 19 and projects downwardly into the tank. A similar annular passage 28 is thus provided in fitting 15.

Fitting 15 may have connected thereto a pipe 44 serving a temperature or pressure relief valve (not shown). By suitable flanged connections, a pipe 18 leading from heater 16, and a pipe 45 for conveying hot water to various fixtures or other draw-off points may be connected to fitting 15.

Referring now to Fig. 1, the hot water circulating system includes a main 45, which as shown may be graduated size, such main supplying suitable taps 46 serving suitable plumbing fixtures in accordance with conventional practice. A return line 47 completes the circuit, said return line connecting into the cold water fitting 13 at boss 40; thus provision is made for a complete circuit of water from and to the tank 10. A conventional drain cock 48 may be provided, in accordance with standard practice, to drain the tank and associated piping. Similarly, a drain (not shown) may be provided at heater 16 to provide for the drainage thereof. A suitable piping connection, as 42, is made with a cold water feed main.

The system is initially filled by flow of water from pipe 42, through the hollow tube 24 in fitting 13, thence into tank 10 and through tube 43 to fill the hot water feed line 45 and return 47. As will be obvious, cold water line 17, heater 16, and hot water line 18 will be simultaneously filled.

As indicated in Figs. 2 and 4, the annular passages 28 provide channels of water flow between the tank 10 and the respective body portions of fittings 13 and 15.

To rid the system of air, and thus prevent air binding of tank 10 and the upper portion of pipe 18, there is provided a suitable opening or openings 50 in the side wall of tube 43; such opening or openings 50 provide for the escape of air into main 45, from which it may be eliminated from the system through taps 46.

During the stage of heating of the water in tank 10, a thermo-syphonic flow through pipe 18, downwardly through annular opening 28 of fitting 15, through tank 10, then downwardly through annular opening 28 of fitting 13, and thence to the heater 16 through pipe 17 is set in motion. Such circulation continues until an actuating member 52 of the thermostat, see Fig. 4, has attained the setting point temperature of the thermostat. By operation of the thermostat, the combustion of fuel in heater 16, may then be substantially shut off, as in the circumstance of the use of oil or gas as fuel, or the combustion of a coal fire appreciably lessened through suitable automatic operation of damper means. Such fuel combustion devices, being familiar in the art and not a part of this invention, are not shown.

Air liberated from the water in the system during the heating stage finds its way through opening or openings 50 and thence into the piping 45. Similarly, steam or other vapor generated during the heating stage passes into piping 45, where it is condensed by its contact with the relatively cooler water therein. Dangerous accumulations and/or discharges of steam at the taps 46, are therefore precluded.

In substantial coincidence with the initial flow of heated water through pipe 18 into the tank, thermo-syphonic circulation through mains 45 and return line 47 is started. Such circulation is initiated by reason of the heating up of tube 43 and its water content by contact of the heated water flowing through fitting 15 and passing downwardly about the outer surface of tube 43 before passing through opening 28 into tank 10. A substantial difference in temperature is thus quickly created between tube 43 and the water in main 45, return line 47 and cold water tube 24. Circulation is accelerated by the direct entry of a relatively small volume of water at elevated temperature directly into tube 43, and thence into pipe 45, through openings 50a; it is additionally furthered by the "pumping" effect of air and/or steam bubbles escaping through opening 50 and flowing upwardly through piping 45.

If, during this stage of thermo-syphonic circulation through piping 45 and 47, the heater 16 remains in full operative status, the heater will draw the water through fitting 13, around tube 24 and into pipe 17, through which it will pass through heater 16, pipe 18, and into fitting 15 for entry into the tank 10. Such action accelerates the heating up of the water throughout the entire circulation system, as the comparatively cool water in the lower portion of main 45 and return line 47 is rapidly moved into heat absorbing contact with heater 16. The accentuated circulation through mains 45 and return line 47 accelerates the thermo-syphonic flow through the circulation system.

Should fuel combustion in heater 16 be shut off or restricted after the thermo-syphonic circulation through piping 45 and 47 has commenced, the "pump effect" of the heater thereby becoming dormant, the flow of water, following the path of least resistance, will be into and through the body of fitting 13, out annular opening 28 of such fitting and into the storage tank, whence it will again enter pipe 45 via tube 43. A continual circulation thus exists regardless of whether the heater 16 is in operative or dormant status; the paths of circulation being in all circumstances entirely non-conflicting and non-short-circuiting.

The drawing of water from the system by the opening of any or all of the taps 46 does not interrupt the cycle of circulation; it accelerates the movement of water by drawing the hot water in the storage tank to the highest elevation of the circulating system. Water drawn from the system will be simultaneously replaced by a flow of cold water through connection 42 entering the tank 10 through the openings 26 of tube 24, the baffle 27 of such tube deflecting the cold water along the bottom of the tank 10, and commingling it with the warm water already present in the tank. It will be seen therefore that a direct flow of cold water from fitting 13 to the top of tank 10 or to tube 43 of fitting 15 is effectively prevented; such flow, if permitted would result in a delivery of tepid water to the pipe 45, and would slow thermo-syphonic circulation through the system. Preferably, the thermostat 52 is located adjacent the intermediate zone of the tank 10, to preclude rapid lowering of temperature, during the stage of hot water withdrawal, thereby conserving fuel in the operation of the heater 16. Assuming heater 16 to be in dormant status when the flow of cold water into the tank commences, a considerable volume of water must be drawn off at the taps 46 before the water of the intermediate zone, in contact with the thermostat, is lowered in temperature, to initiate the operation of the heater. Accordingly, therefore the heater 16 is not subject to intermittent or spasmodic conditions of activity and inactivity. When the heater 16 again becomes active, the water flowing through 17 will include relatively warm water from tank 10 which flows downwardly through annular opening 28 of fitting 13, admixed with warm water from return main 47, flowing around the tube 24 and thence into piping 17. Excepting during the stage of initial filling, cold water does not come into contact with heater 16.

As indicated in Fig. 2, the cold water tube 24 is also provided with openings 50, the stated openings serving to accelerate flow of water through pipe 17 to heater 16, by causing a by-pass of cold water through the openings and into the stated pipe.

In conventional water heating systems which are thermostatically controlled and therefore intermittently heated, reverse flow is common, because when the hot water heater is inactive, its large exposed surface causes it to function as a cooling element, the effect of which is to draw water downwardly through the normal hot water pipe leading to the storage tank. In this invention, reverse flow is effectively checked because the method of connecting the hot water circulating return and the cold water supply through the cold water fitting 13 utilizes the chilling effect of the water contained within central tube 24 to cool the water within the body of fitting 13; therefore the relatively heavier water in this part of the system moves toward the lowest part of the system, namely the heater 16.

As indicated in Fig. 4, the hot water supply tube 43 extends into the tank 10 to a point considerably below the upper surface of the tank. Preferably, the tube should project, say, one-third into the tank, the actual degree of projection being proportioned to the size of the tank. Such projection permits the accumulation of a stratum of water of temperature appreciably higher than required at taps 46 between the terminal opening 43a of the tube and the upper wall of the tank. Such stratum or "zone" is indicated by the broken line A—A in Fig. 4. The diffusing effect of baffle 27 of cold water tube 24 similarly creates a zone of cool water at the lower portion of the tank. The approximate location of such zone is indicated by the line B—B. Intermediate the two zones, therefore, is a zone constituting the main reservoir of the tank, from which zone water flows upwardly through tube 43 in the normal circulating cycle, and in the circumstance of a draw off of water from one of the taps 46. The sensitive element 52 of the thermostat is advantageously located in such intermediate, i. e., central, zone. There is therefore permitted a safe accumulation or storage of water, the temperature of which may be considerably above the desired temperature for domestic purposes. As water is drawn from the intermediate zone, the resultant disturbance of water within the tank will cause the hotter water and water from the cooler zone to commingle with the water being drawn from the intermediate zone. Thus, the cooling effect of such lower zone water is offset by an equivalent heating effect of water drawn from the upper zone. As water is never drawn directly from the upper zone into the circulating system, the higher average temperature within the tank may be maintained, and therefore a smaller capacity of tank, as compared with other water supply systems not employing this invention, may be utilized. Also, as water in substantial volume may never flow directly from heater 16 to main 45 maximum effect of the stated heater may be realized, by permitting the heating of the water therein to a degree which in systems not using this invention would be dangerous.

The creation of a zone of hot water has the effect of forcing the water then in the tank downwardy therein, and thus enforces flow through annular opening 28 in fitting 13 and into pipe 17 communicating with the hot water heater 16.

From the above, it appears that my invention provides a circulatory hot water supply system comprising a tank, a heating coil, a circuit of tap-provided, i. e. faucet-provided piping including a terminal pipe communicating with an upper zone, preferably the upper central zone, of the tank for withdrawing hot water therefrom, such circuit of piping further including a terminal pipe communicating jointly with a lower zone of the tank and with one end of the heating coil, the other end of the heating coil being connected to an upper zone of the tank, and preferably traversing the terminal pipe delivering hot water from the tank into the circuit of piping.

Whereas I have described my invention by reference to specific forms thereof, it will be understood that many changes and modifications may be made without departing from the spirit of the invention.

I claim:

1. A circulatory hot water supply system comprising a tank, a heating coil, a circuit of faucet-provided piping including a terminal pipe communicating with an upper zone of the tank for withdrawing hot water from the tank and further including terminal piping communicating with a lower zone of the tank to return warm water to the tank during the period of inactivity of the heating coil and warm water to one end of the heating coil during the period of activity of the heating coil, piping leading from a cold water supply traversing said warm water return terminal piping and discharging into said lower zone of the tank, and piping connecting the other end of the heating coil to an upper zone of the tank.

2. A circulatory hot water supply system comprising a tank, a heating coil, a circuit of faucet-provided piping including a terminal pipe communicating with an upper central zone of the tank for withdrawing hot water from the tank and further including terminal piping communicating with a lower zone of the tank to return warm water to the tank during the period of inactivity of the heating coil and warm water to one end of the heating coil during the period of activity of the heating coil, piping leading from a cold water supply traversing said warm water return terminal pipe and discharging into said lower zone of the tank, and piping connecting the other end of the heating coil to an upper zone of the tank, said last-named piping traversing said first-named terminal pipe delivering heated water from the upper central zone of the tank into said circuit of piping.

3. A circulatory hot water supply system comprising a tank, a heating coil, a circuit of faucet-provided piping including a terminal pipe communicating with an upper zone of the tank for withdrawing hot water from the tank and further including terminal piping communicating with a lower zone of the tank during the period of inactivity of the heating coil to return warm water to the tank and warm water to one end of the heating coil during the period of activity of the heating coil, piping leading from a cold water supply and extending through said warm water return terminal piping thereby preheating said water supply and discharging the same directly into the lower zone of the tank, piping connecting the other end of the heating coil to an upper zone of the tank, and thermostatic means responsive to the temperature of the water in said upper zone of the tank for controlling the periods of activity and inactivity of the heating coil.

4. A circulatory hot water supply system comprising a tank, a heating coil, a circuit of faucet-provided piping including a terminal pipe communicating with an upper central zone of the tank for withdrawing hot water from the tank and further including terminal piping communicating with a lower zone of the tank during the period of inactivity of the heating coil to return warm water to the tank and warm water to one end of the heating coil during the period of activity of the heating coil, piping leading from a cold water supply and extending through said warm water return terminal piping thereby preheating said water supply and discharging the same directly into the lower zone of the tank, piping connecting the other end of the heating coil to an upper zone of the tank, said last-named piping traversing said first-named terminal pipe delivering heated water from the upper central zone of the tank into said circuit of piping, and thermostatic means responsive to the temperature of the water in said upper central zone of the tank for controlling the periods of activity and inactivity of the heating coil.

WILLIAM C. GROENIGER.